US006598979B2

(12) United States Patent
Yoneno

(10) Patent No.: US 6,598,979 B2
(45) Date of Patent: Jul. 29, 2003

(54) CONTROL OF LUMINOUS FLUX WHEN PERSON APPROACHES PATH OF PROJECTION RAYS EMITTED FROM PROJECTOR

(75) Inventor: Kunio Yoneno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/959,531

(22) PCT Filed: Apr. 24, 2001

(86) PCT No.: PCT/JP01/03541

§ 371 (c)(1),
(2), (4) Date: Oct. 29, 2001

(87) PCT Pub. No.: WO01/84231

PCT Pub. Date: Nov. 8, 2001

(65) Prior Publication Data

US 2002/0159039 A1 Oct. 31, 2002

(30) Foreign Application Priority Data

Apr. 25, 2000 (JP) ........................................ 2000-123863

(51) Int. Cl.$^7$ ............................................... G03B 21/14
(52) U.S. Cl. ......................................... 353/122; 353/28
(58) Field of Search ........................... 353/28, 97, 122, 353/85; 348/586, 590, 607

(56) References Cited

U.S. PATENT DOCUMENTS 6,361,173 B1 * 3/2002 Vlahos et al. ................. 353/97
6,460,999 B1 * 10/2002 Suzuki ......................... 353/79

FOREIGN PATENT DOCUMENTS

JP         06-347748     * 12/1994

* cited by examiner

Primary Examiner—William Dowling
(74) Attorney, Agent, or Firm—Oliff & Berridge, PLC

(57) ABSTRACT

A projector of the present invention includes: an electro-optic device that outputs rays modulated according to a given image signal, an image processing unit that transmits the image signal to the electro-optic device, and a luminous flux control device that controls an output luminous flux of projection rays, which are output from the electro-optic device and projected. The luminous flux control device has: a detector unit that detects a person who approaches a path of the projection rays; and a controller unit that controls the output luminous flux of the projection rays when the detector detects the approach of the person.

This arrangement controls the output luminous flux of the projection rays when a person approaches the path of the projection rays and the projection rays directly enter the field of view of the person, thus effectively relieving the unpleasantness due to the incidence of the projection rays.

11 Claims, 9 Drawing Sheets

CONTROL OF LUMINOUS FLUX WHEN PERSON APPROACHES PATH OF PROJECTION RAYS EMITTED FROM PROJECTOR

TECHNICAL FIELD

The present invention relates to a technique of controlling the quantity of light when a person approaches the path of projection rays emitted from a projector.

BACKGROUND ART

A projector widely used for presentation is an image display apparatus that projects light (projection rays) representing an image in response to an image signal output from an image supply apparatus, such as a computer, so as to display the image. The user performs the presentation while pointing out the image projected on the screen.

When the image is projected onto the screen from the projector located in front of the screen (such projection is referred to as 'front projection'), there is a space between the projector and the screen to allow the pass of the projection rays. The user or another person may thus approach the path of the projection rays. In such cases, when the person shifts the line of sight toward the projector, the projection rays directly enter the filed of vision of the person. The person may directly look at the projection lens to check if the projector normally works. In this case, the person may be dazzled and feel unpleasant. The designed luminous flux of the projection rays output from the projector tends to gradually increase, which may worsen the user's feeling of unpleasantness.

The object of the present invention is thus to solve the above drawbacks of the prior art technique and to provide a technique of controlling the output luminous flux of projection rays output from a projector, so as to relieve the unpleasantness due to the direct incidence of the projection rays into the field of vision of a person.

DISCLOSURE OF THE INVENTION

At least part of the above and the other related objects of the present invention is attained by a projector including an electro-optic device that outputs rays modulated according to a given image signal, an image processing unit that transmits the image signal to the electro-optic device, and a luminous flux control device that controls an output luminous flux of projection rays, which are output from the electro-optic device and projected. The luminous flux control device has: a detector unit that detects a person who approaches a path of the projection rays; and a controller unit that controls the output luminous flux of the projection rays when the detector detects the approach of the person.

When a person approaches the path of the projection rays and the projection rays directly enter the filed of vision of the person, the projector of the present invention detects the approach of the person and controls the output luminous flux of the projection rays. This arrangement effectively relieves the unpleasantness due to the direct incidence of the projection rays output from the projector into the field of vision of the person.

In a first preferable application of the projector of the present invention, the detector unit includes: a luminance detector having a light receiving unit that is disposed in a neighborhood of a projection lens, from which the projection rays are output, and receives reflected rays obtained by reflection of the projection rays, the luminance detector outputting a reflection luminance of the reflected rays received by the light receiving unit as a reflection luminance signal; a reference luminance level generator that specifies a reference luminance based on a luminance signal level of an image signal corresponding to the projection rays, and outputs the specified reference luminance as a reference luminance signal; and a luminance comparator that compares the reflection luminance signal with the reference luminance signal. The controller unit controls the output luminous flux of the projection rays according to an output of the luminance comparator.

This arrangement facilitates the construction of the detector unit and the controller unit of the luminous flux control device.

The reflection luminance of the reflected rays detected by the luminance detector varies with a variation in output luminous flux of the projection rays. It is accordingly desirable that the reference luminance signal output from the reference luminance level generator varies with the variation in output luminous flux of the projection rays. The reference luminance level generator in the first application specifies the reference luminance based on the luminance signal level of the image signal corresponding to the projection rays. This arrangement thus enables the output reference luminance signal to be varied with a variation in output luminous flux of the projection rays.

In a second preferable application of the projector of the present invention, the image processing unit has a reference image signal generator that generates a reference image signal, which is used to output the projection rays corresponding to a preset luminance signal level, and transmits the reference image signal to the electro-optic device. The detector unit includes: a luminance detector having a light receiving unit that is disposed in a neighborhood of a projection lens, from which the projection rays are output, and receives reflected rays obtained by reflection of the projection rays, the luminance detector outputting a reflection luminance of the reflected rays received by the light receiving unit as a reflection luminance signal; a reference luminance level generator that registers, as a reference luminance signal, a reflection luminance output from the luminance detector when the projection rays corresponding to the preset luminance signal level are output in response to the reference image signal; and a luminance comparator that compares the reflection luminance signal with the reference luminance signal. The controller unit controls the output luminous flux of the projection rays according to an output of the luminance comparator.

Like the first application, the second application facilitates the construction of the detector unit and the controller unit. While the reference luminance level generator in the first application varies the reference luminance signal with a variation in output luminous flux of the projection rays, the reference luminance level generator in the second application sets the reflection luminance in response to the preset luminance signal level to the reference luminance signal. The second application, however, exerts the similar functions and effects to those of the first application.

In a third preferable application of the projector of the present invention, the detector unit includes: a luminance detector having an infrared emission unit and an infrared receiving unit that are disposed in a neighborhood of a projection lens, from which the projection rays are output, the infrared receiving unit of the luminance detector receiving reflected rays of infrared radiation emitted from the infrared emission unit, the luminance detector outputting a reflection luminance of the received reflected infrared rays as a reflection luminance signal; and a luminance comparator that compares the reflection luminance signal with a preset reference luminance signal. The controller unit controls the output luminous flux of the projection rays according to an output of the luminance comparator.

In a fourth preferable application of the projector of the present invention, the detector unit includes: an ultrasonic wave detector having an ultrasonic wave transmitter unit and an ultrasonic wave receiver unit that are disposed in a neighborhood of a projection lens, from which the projection rays are output, the ultrasonic wave receiver unit of the ultrasonic wave detector receiving a reflected wave of an ultrasonic wave transmitted from the ultrasonic wave transmitter unit, the ultrasonic wave detector measuring a strength of the received ultrasonic wave; and an ultrasonic wave comparator that compares the measurement of the received ultrasonic wave strength with a preset reference received ultrasonic wave strength. The controller unit controls the output luminous flux of the projection rays according to an output of the ultrasonic wave comparator.

In a fifth preferable application of the projector of the present invention, the detector unit includes: an ultrasonic wave transmitter unit that is disposed in a neighborhood of a projection lens, from which the projection rays are output; an ultrasonic wave receiver unit that is disposed in the neighborhood of the projection lens and receives a reflected wave of an ultrasonic wave transmitted from the ultrasonic wave transmitter unit; a time measurement unit that continues measuring time between transmission of the ultrasonic wave from the ultrasonic wave transmitter unit and receipt of the ultrasonic wave by the ultrasonic wave receiver unit; and a time comparator that compares the observed time by the time measurement unit with a preset reference time. The controller unit controls the output luminous flux of the projection rays according to an output of the time comparator.

Like the first and the second applications, these third to fifth applications simplify the construction of the detector unit and the controller unit.

In accordance with one preferable embodiment of the projector, the luminous flux control device further has an information unit that, when the controller unit controls the output luminous flux of the projection rays, informs the person of the controlled output luminous flux of the projection rays.

This arrangement readily informs the person of the fact that the person approaches the path of the projection rays and thereby the output luminous flux of the projection rays is controlled.

BEST MODES OF CARRYING OUT THE INVENTION

Figure 1:
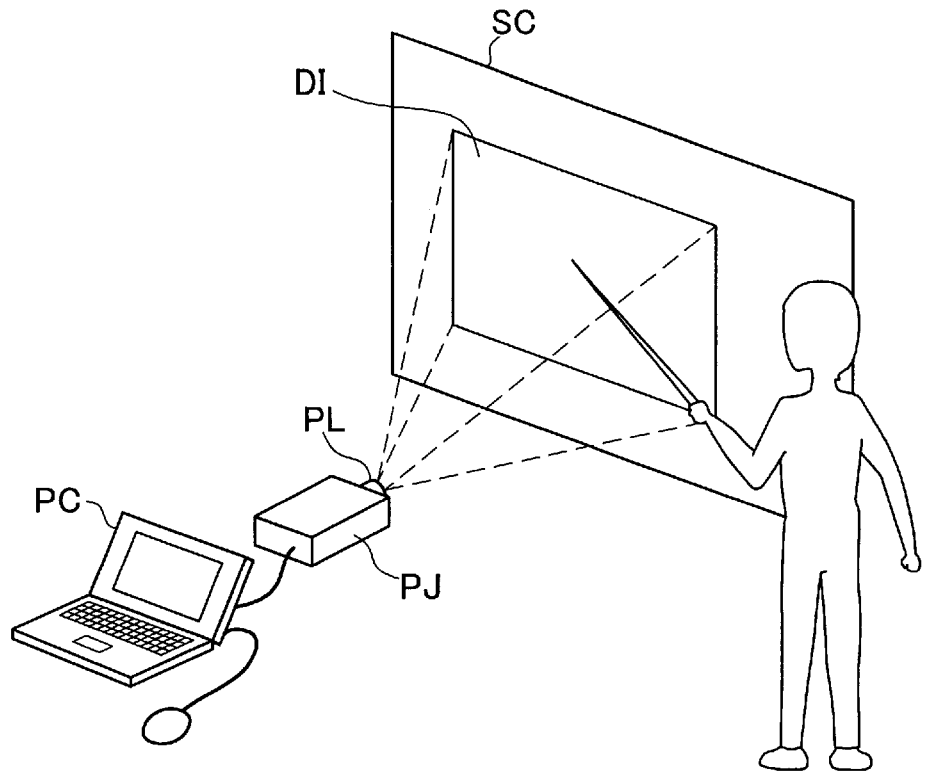
FIG. 1 illustrates a projection display system utilizing a projector of the present invention.

Some modes of carrying out the invention are discussed below as preferred embodiments. FIG. 1 illustrates a projection display system utilizing a projector of the present invention. A projector PJ of the present invention projects light (projection rays), which represents an image output from a computer PC, via a projection lens PL onto a projection surface DI of a screen SC, so as to display the image.

A. First Embodiment

Figure 2:
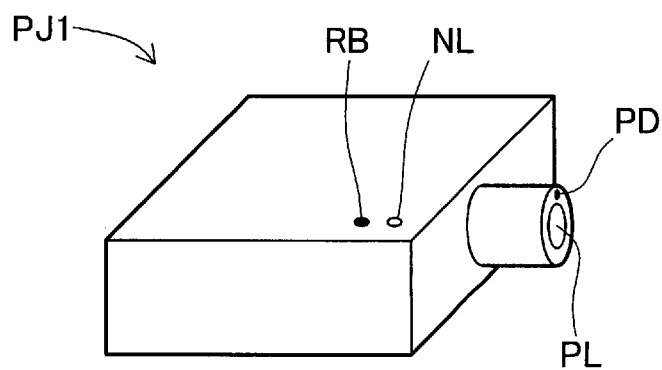
FIG. 2 is a perspective view schematically illustrating the appearance of a projector PJ1 in a first embodiment of the present invention.

FIG. 2 is a perspective view schematically illustrating the appearance of a projector PJ1 in a first embodiment of the present invention. A photodiode PD is disposed in a neighborhood of the projection lens PL of this projector PJ1 toward the light outgoing face of the projection lens PL. A light emitting diode NL and a reset button RB are mounted on the top face of the casing of the projector PJ1.

Figure 3:
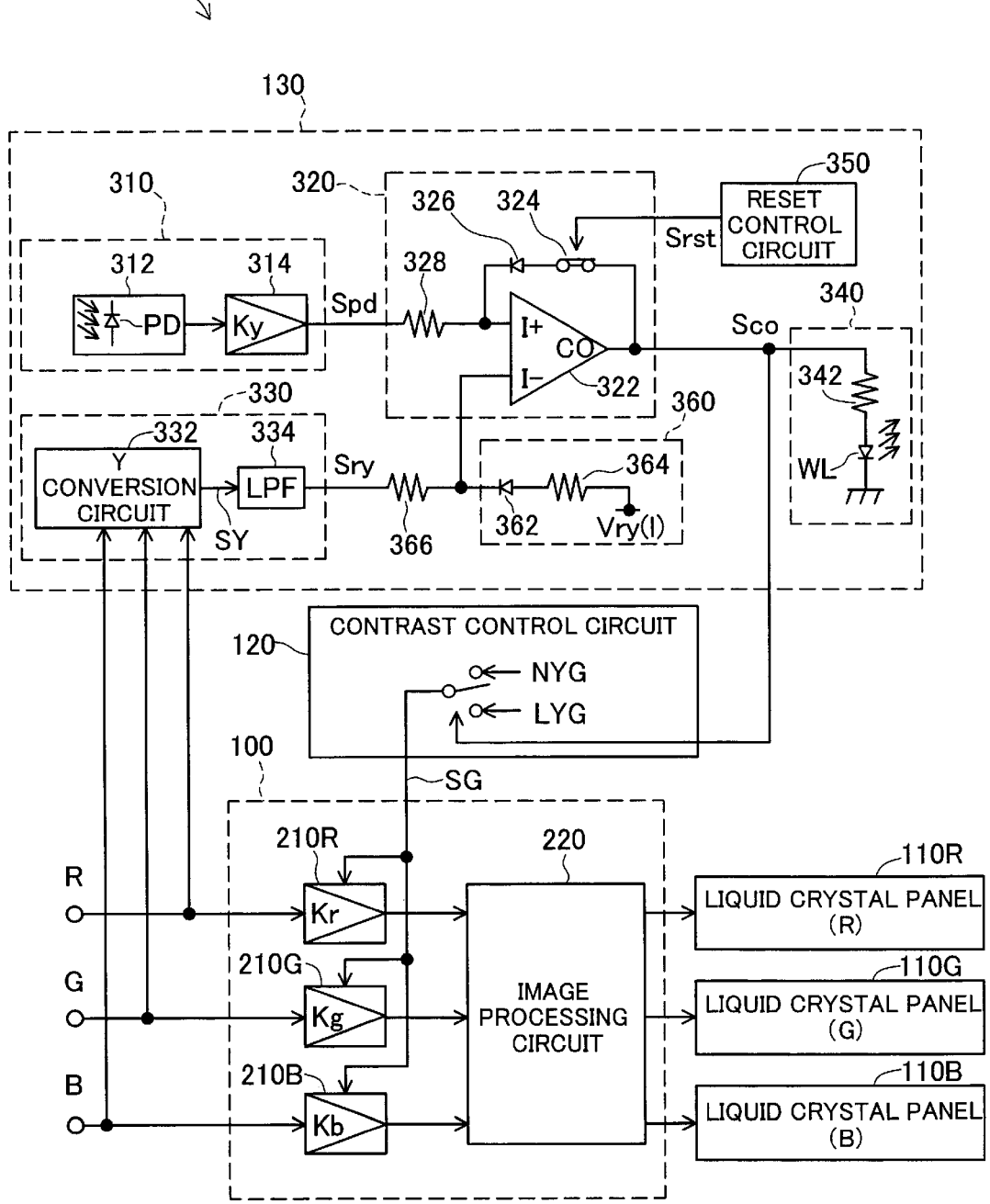
FIG. 3 schematically illustrates the structure of the projector PJ1.

FIG. 3 schematically illustrates the structure of the projector PJ1. The projector PJ1 includes an image signal processing unit 100, which processes respective color signals of red (R), green (G), and blue (B) (hereinafter these three color signals may collectively be referred to as 'RGB signals'), three liquid crystal panels 110R, 110G, and 110B corresponding to the respective color signals, a contrast control unit 120, and a detector unit 130.

The image signal processing unit 100 has three amplifier circuits 210R, 210G, and 210B and an image processing circuit 220. The three amplifier circuits 210R, 210G, and 210B respectively amplify the input color signals R, G, and B. The three amplifier circuits 210R, 210G, and 210B are constructed from variable gain amplification circuits, and their amplification factors Kr, Kg, and Kb are controlled according to the signal level of a gain control signal SG output from the contrast control circuit 120 as discussed later.

The image processing circuit 220 processes the amplified color signals output from the respective amplifier circuits 210R, 210G, and 210B so that these color signals undergo diverse image processing, for example, gamma control and scaling. The processed color signals after the diverse image processing are given to the corresponding liquid crystal panels 110R, 110G, and 110B.

The projector PJ1 has a non-illustrated optical system for projecting images. The optical system includes a lighting unit, a color separation optical system that separates light emitted from the lighting unit into three color rays, which respectively correspond to the colors of the three liquid crystal panels 110R, 110G, and 110B, a composite optical system that combines the three color rays emitted from the three liquid crystal panels 110R, 110G, and 110B, and the projection lens PL (see FIG. 2). The structure of this optical system is described in detail, for example, JAPANESE PATENT LAID-OPEN GAZETTE No. 10-171045 disclosed by the applicant of the present invention, and is thus not specifically described here.

Each of the liquid crystal panels 110R, 110G, and 110B modulates the corresponding color ray output from the color separation optical system according to the input color signal and outputs an image ray corresponding to the color signal. The image rays of the respective colors are combined by the composite optical system to a composite light beam, which is projected via the projection lens PL onto the screen SC (see FIG. 1).

The detector unit 130 includes a luminance detector 310, a luminance comparator unit 320, a reference luminance level generator 330, and an information unit 340. The luminance detector 310 has a light receiving unit 312 utilizing the photodiode PD (see FIG. 2) and an amplifier circuit 314 that amplifies signals output from the light receiving unit 312. The luminance detector 310 receives the projection rays (reflected rays reflected by the screen SC (FIG. 1) or by the human body in the path of the projection rays, and outputs the luminance of the received reflected rays (reflection luminance) as a reflection luminance signal Spd. Like the amplifier circuits 210R, 210G, and 210B, the amplifier circuit 314 is constructed as a variable gain amplification circuit, and its amplification factor Ky is controlled by a non-illustrated control signal.

The reference luminance level generator 330 has a Y conversion circuit 332 and a low pass filter (LPF) 334. The Y conversion circuit 332 converts the RGB signals into a luminance signal (Y signal) SY. The LPF 334 smoothes the luminance signal SY and outputs the smoothed signal as a reference luminance signal Sry.

The luminance comparator unit 320 includes a comparator 322. The reflection luminance signal Spd is input into a positive input terminal I+ of the comparator 322 via a resistor 328, whereas the reference luminance signal Sry is input into a negative input terminal I− of the comparator 322 via a resistor 366. An output terminal CO and the positive input terminal I+ of the comparator 322 are connected with each other via a switch 324 and a diode 326, which accordingly constitute a positive feedback circuit. When the signal level of the positive input terminal I+ is lower than the signal level of the negative input terminal I−, the signal level of the output terminal CO of the comparator 322 is set to a low level. When the signal level of the positive input terminal I+ is higher than the signal level of the negative input terminal I−, on the contrary, the signal level of the output terminal CO is set to a high level. Once the signal level of the output terminal CO rises to the high level, the positive feedback effects keep the signal level high. Even when the signal level of the reflection luminance signal Spd output from the luminance detector 310 becomes lower than the signal level of the negative input terminal I−, the positive input terminal I+ is kept at the high level and the comparator 322 does not carry out the comparison. In response to a press of the reset button RB (see FIG. 1), a reset control circuit 350 outputs a one-shot pulse as a reset signal Srst, which turns the switch 324 off to cancel the positive feedback. This causes the comparator 322 to resume the comparison.

The luminance comparator unit 320 compares the reflection luminance represented by the reflection luminance signal Spd output from the luminance detector 310 with the reference luminance represented by the reference luminance signal Sry output from the reference luminance level generator 330, and outputs the result of the comparison as a detection signal Sco.

A limiter circuit 360 is connected to the negative input terminal I− of the comparator 322. The limiter circuit 360 restricts the fall of the signal level input into the negative input terminal I−, so as to prevent undesirable function of the comparator 322 by the environmental light. In the construction of FIG. 3, the negative input terminal I− is connected to a restriction level Vry(l) via a resistor 364 and a diode 362. It is preferable that the resistor 364 is set to be sufficiently smaller than the resistor 366. Even when the reference luminance signal Sry output from the reference luminance level generator 330 becomes not higher than the restriction level Vry(l), the signal level of the negative input terminal I− is substantially fixed to the restriction level Vry(l). The structure of the limiter circuit 360 is not restricted to the construction of this embodiment, but a diversity of limiter circuits may be applied for the limiter circuit 360.

The contrast control circuit 120 selects either one of a first signal level NYG and a second signal level LYG as a gain control signal SG, based on the detection signal Sco output from the detector unit 130. When the detection signal Sco output from the output terminal CO of the comparator 322 is the low level, the first signal level NYG is selected as the gain control signal SG. When the detection signal Sco is the high level, on the other hand, the second signal level LYG is selected as the gain control signal SG. The first signal level NYG determines amplification factors Kr(n), Kg(n), and Kb(n) of the respective amplifier circuits 210R, 210G, and 210B in the case of normal projection of images. The second signal level LYG determines amplification factors Kr(l), Kg(l), and Kb(l) of the respective amplifier circuits 210R, 210G, and 210B in the case of the controlled output luminous flux of the projection rays. The first signal level NYG and the second signal level LYG are readily generated according to the type of the variable gain amplification circuit by a general voltage source circuit or current source circuit. The signal level may also be readily adjusted by a general variable voltage source circuit or variable current source circuit.

The information unit 340 has a resistor 342 and a light emitting diode NL, which are connected in series between the output terminal CO of the comparator 322 and a power source (ground). The light emitting diode NL (see FIG. 2) emits light in response to a rise of the level of the detection signal Sco output from the output terminal CO of the comparator 322 to the high level. A diversity of other techniques may be applied for the information unit; for example, a voice information unit and a picture information unit.

Figure 4:
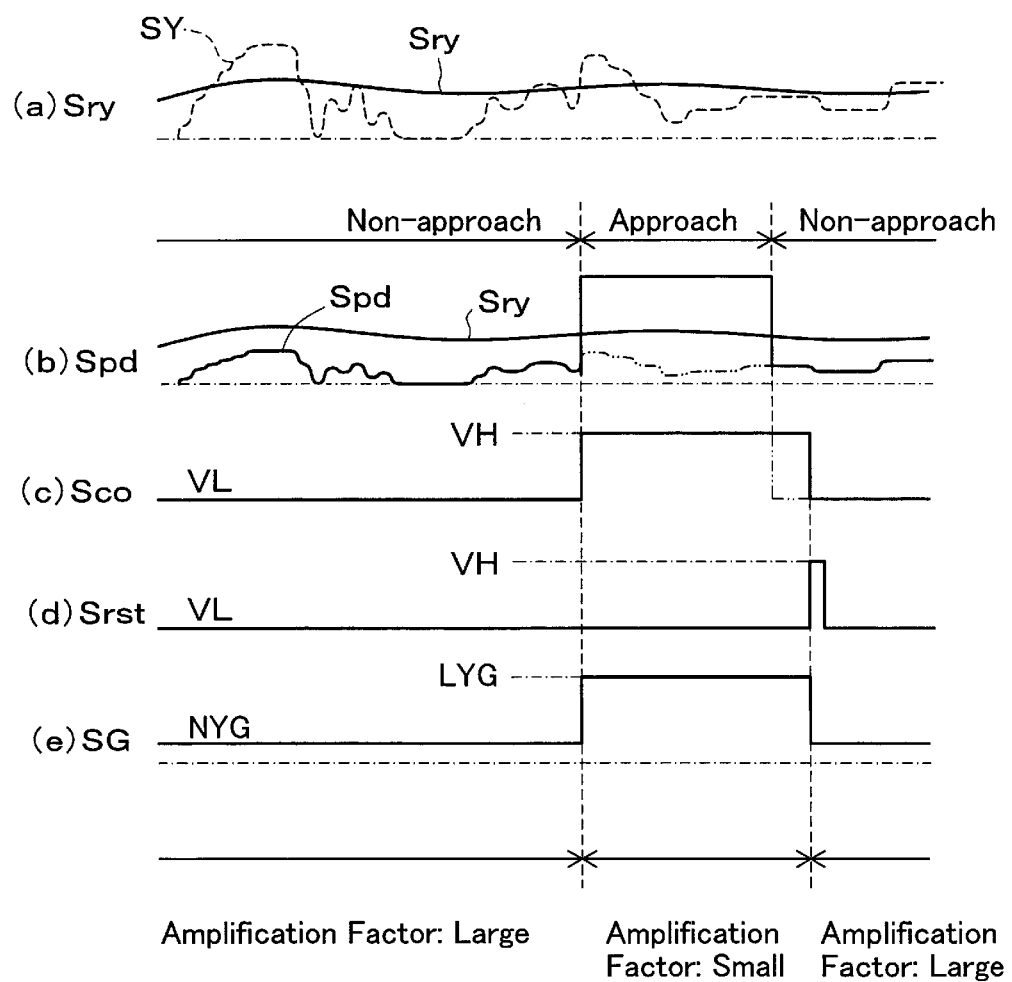
FIG. 4 shows the process of controlling an output luminous flux of projection rays due to approach of a person into a path of the projection rays while the projector PJ1 of the first embodiment is used to project an image.

FIG. 4 shows the process of controlling the output luminous flux of projection rays due to approach of a person into the path of the projection rays while the projector PJ1 of the first embodiment is used to project an image. The reflected rays received by the light receiving unit 312 of the luminance detector 310 are part of the projection rays, so that the strength of the reflected rays varies with a variation in output luminous flux of the projection rays. As shown in FIG. 4(b), the reflection luminance signal Spd output from the luminance detector 310 thus varies according to the luminance signal SY shown in FIG. 4(a). When a person approaches the path of the projection rays, part of the projection rays are reflected by the human body. The reflection luminance detected by the luminance detector 310 depends upon the length of the path from the projection lens PL to the photodiode PD. The greater length of the path of the reflected rays accordingly leads to the lower reflection luminance. Approach of a person into the path of the projection rays thus heightens the signal level of the reflection luminance signal Spd, compared with that under the non-approach condition, as shown in FIG. 4(b). The approach of a person closer to the projector PJ1 leads to the higher signal level. The amplification factor Ky of the amplifier circuit 314 is adjusted in advance to make the signal level of the reference luminance signal Sry higher than the level of the reflection luminance signal Spd under the non-approach condition but lower than the level of the reflection luminance signal Spd under the condition of approach of a person within a preset distance from the projection lens PL (that is, under the approach condition).

The following procedure may be applied to set the amplification factor Ky. The procedure displays a white luster image and locates a reflector having a reflection factor equivalent to the reflection factor of the human face in the vicinity of a certain position where approach of the person is detected (that is, a preset distance from the projection lens PL of the projector PJ1). The procedure then gradually increases the amplification factor Ky of the amplifier circuit 314 to find a specific value of the amplification factor Ky, at which the signal level of the detection signal Sco rises from a low level VL to a high level VH. This completes setting of the amplification factor Ky.

In the case where a person is within the preset distance, the signal level of the detection signal Sco output from the luminance comparator unit 320 changes from the low level VL to the high level VH and is kept at the high level VH as shown in FIG. 4(c). The rise in signal level of the gain control signal SG from the first signal level NYG to the second signal level LYG decreases the amplification factors Kr, Kg, and Kb of the amplifier circuits 210R, 210G, and 210B (see FIG. 3). This decreases the signal levels of the color signals transmitted to the liquid crystal panels 110R, 110G, and 110B. This regulates the quantities of the respective color rays output from the liquid crystal panels 110R, 110G, and 110B, thus controlling the output luminous flux of the projection rays in response to detection of the approach of a person.

While the detection signal Sco is kept at the high level VH, the electric current is supplied to the light emitting diode NL of the information unit 340 for light emission. The person is thus informed that the output luminous flux of the projection rays is being controlled due to the approach into the path of the projection rays. Such notification asks the user to move outside the path of the projection rays.

After the person moves outside the path of the projection rays (that is, under the non-approach condition), a press of the reset button RB (see FIG. 1) cancels the control of the luminous flux. At this moment, the reset control signal 350 outputs a one-shot pulse signal, which changes from the low level VL to the high level VH, as the reset signal Srst as shown in FIG. 4(d). The signal level of the detection signal Sco kept at the high level VH is thus returned to the low level VL, and the contrast control circuit 120 selects the first signal level NYG as the signal level of the gain control signal SG. This sets the general amplification factors Kr(n), Kg(n), and Kb(n) to the amplification factors of the amplifier circuits 210R, 210G, and 210B, thereby canceling the control of the output luminous flux of the projection rays.

In the arrangement of this embodiment, the reference luminance signal Sry is generated by smoothing the luminance signal SY, because of the following reason. The total strength of the output luminous flux of the projection rays under the normal projection condition affects the reflection luminance by the human body and thereby varies the level of the reflection luminance signal Spd. Varying the signal level Vry of the reference luminance signal Sry with a variation of the luminance signal SY by taking into account the total strength of the output luminous flux of the projection rays effectively prevents the detection margin of the reflection luminance from varying with a variation in output luminous flux of the projection rays.

As discussed above, when a person is within a preset distance from the projection lens PL in the path of the projection rays, the projector PJ1 of this embodiment controls the output luminous flux of the projection rays, thus effectively relieving the unpleasantness due to the direct incidence of the projection rays output from the projector into the field of vision of the person.

As clearly understood from the above description, the detector unit 130 and the contrast control circuit 120 correspond to the luminous flux control device of the present invention.

B. Second Embodiment

Figure 5:
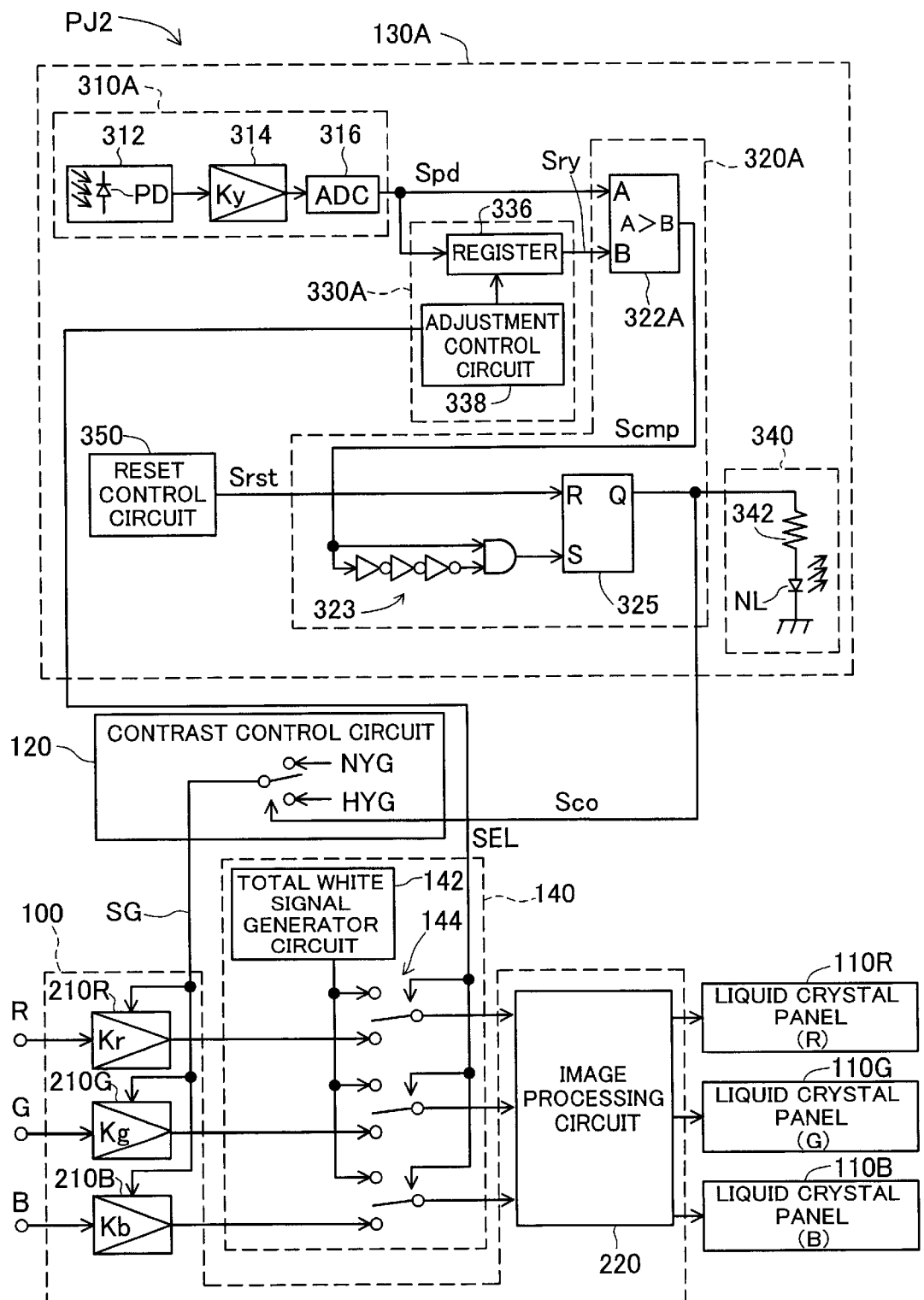
FIG. 5 schematically illustrates the structure of a projector PJ2 in a second embodiment.

FIG. 5 schematically illustrates the structure of a projector PJ2 in a second embodiment. This projector PJ2 has the similar appearance to that of the projector PJ1 of the first embodiment, and illustration of the appearance is thus omitted. The main differences of the projector PJ2 from the projector PJ1 of the first embodiment are that the luminance detector 310, the luminance comparator unit 320, and the reference luminance level generator 330 of the detector unit 130 (FIG. 3) are respectively replaced by a luminance detector 310A, a luminance comparator unit 320A, and a reference luminance level generator 330A, so as to replace the detector unit 130 with a detector unit 130A, and that a reference luminance signal generator 140 is provided between the outputs of the three amplifier circuits 210R, 210G, and 210B of the image signal processing unit 100 (FIG. 3) and the inputs into the image processing circuit 220.

The luminance comparator unit 320A is obtained by replacing the analog comparator 322 of the luminance comparator unit 320 (see FIG. 3) with a digital comparator 322A. The digital comparator 322A compares a digital reflection luminance signal Spd with a digital reference luminance signal Sry and outputs the result of the comparison as a comparison signal Scmp. The comparison signal Scmp is set to a low level when the reflection luminance signal Spd is lower than the reference luminance signal Sry, while being set to a high level when the reflection luminance signal Spd is higher than the reference luminance signal Sry. The comparison signal Scmp is input into a one-shot pulse circuit 323. The one-shot pulse circuit 323 outputs a one-shot pulse in response to a rise of the signal level of the comparison signal Scmp from the low level to the high level. The output signal from the one-shot pulse circuit 323 is input into a set input (S) of a flip flop (FF) circuit 325. The level of an output (Q) of the FF circuit 325 rises from the low level to the high level at the timing of a rising edge of the pulse signal output from the one-shot pulse circuit 323, and is kept at the high level. This detects an increase in reflection luminance signal Spd to exceed the reference luminance signal Sry due to approach of a person in the path of the projection rays. The output (Q) of the FF circuit 325 accordingly gives a detection signal Sco to the contrast control circuit 120. In response to input of the reset signal Srst from the reset control circuit 350 into a reset input (R) of the FF circuit 325, the output (Q) of the FF circuit 325 kept at the high level is returned to the low level. This resumes the monitor of approach of the person.

The luminance detector 310A has an AD converter circuit 316 to convert analog signals output from the amplifier circuit 314 into digital signals, in addition to the light receiving unit 312 and the amplifier circuit 314 of the luminance detector 310 (FIG. 3). The AD conversion is required since the digital comparator 322A of the luminance comparator unit 320A receives digital inputs. The luminance detector 310A accordingly outputs the digital reflection luminance signal Spd.

The reference luminance level generator 330A has a register 336 and an adjustment control circuit 338. The register 336 stores therein the signal level of the reflection luminance signal Spd at the time of generating a strobe signal from the adjustment control circuit 338, as the signal level of the reference luminance signal Sry.

The reference luminance signal generator 140 has a white luster =signal generator circuit 142 and a selector 144. The white luster signal generator circuit 142 outputs a reference image signal, which is equivalent to a white luster signal. The selector 144 selects either one of the color signal s output from the amplifier circuits 210R, 210G, and 210B and the reference luminance signal according to a select signal SEL output from the adjustment control circuit 338 of the reference luminance level generator 330A.

The signal level of the reference luminance signal Sry is stored in the register 336 according to the following procedure. The reference luminance signal output from the white luster signal generator circuit 142 is selected as each color signal, in response to the select signal SEL output from the adjustment control circuit 338. The selected reference luminance signal is transmitted to the respective color liquid crystal panels 110R, 110G, and 110B via the image processing circuit 220. This causes a white luster image to be projected. At this moment, the signal level of the reflection luminance signal Spd output from the luminance detector 310A is stored into the register 336 synchronously with the strobe signal output from the adjustment control circuit 338. The amplifier circuit 314 of the luminance detector 310A has the amplification factor Ky set to a specific value, for example, a median value. In this manner, the signal level of the reference luminance signal Sry is stored in the register 336.

As described above, in this embodiment, the reflection luminance detected in the case of projection of a white luster image is set as the reference luminance. Unlike the first embodiment, the reference luminance is not varied with a variation in output luminous flux of the projection rays but is kept to a fixed value. Like the first embodiment, however, the arrangement of the second embodiment controls the output luminous flux of the projection rays when a person is within a preset distance from the projection lens PL in the path of the projection rays. This arrangement thus effectively relieves the unpleasantness due to the direct incidence of the projection rays output from the projector into the field of vision of the person.

In the second embodiment, the digital comparator 322A is used for the comparator of the luminance comparator unit 320A. The analog comparator 322 used in the first embodiment may alternatively be applied for the comparator. In the latter case, a voltage source is used as the reference luminance level generator.

As clearly understood from the above description, the detector unit 130A and the contrast control circuit 120 correspond to the luminous flux control device of the present invention.

C. Third Embodiment

Figure 6:
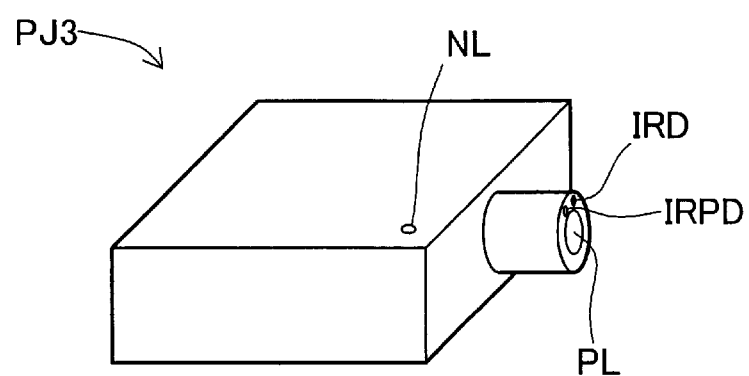
FIG. 6 is a perspective view schematically illustrating the appearance of a projector PJ3 in a third embodiment.

FIG. 6 is a perspective view schematically illustrating the appearance of a projector PJ3 in a third embodiment. An infrared emitting diode IRD and an infrared photodiode IRPD are disposed in a neighborhood of a projection lens PL of this projector PJ3 toward the light outgoing face of the projection lens PL. A light emitting diode NL is mounted on the top face of the casing of the projector PJ3.

Figure 7:
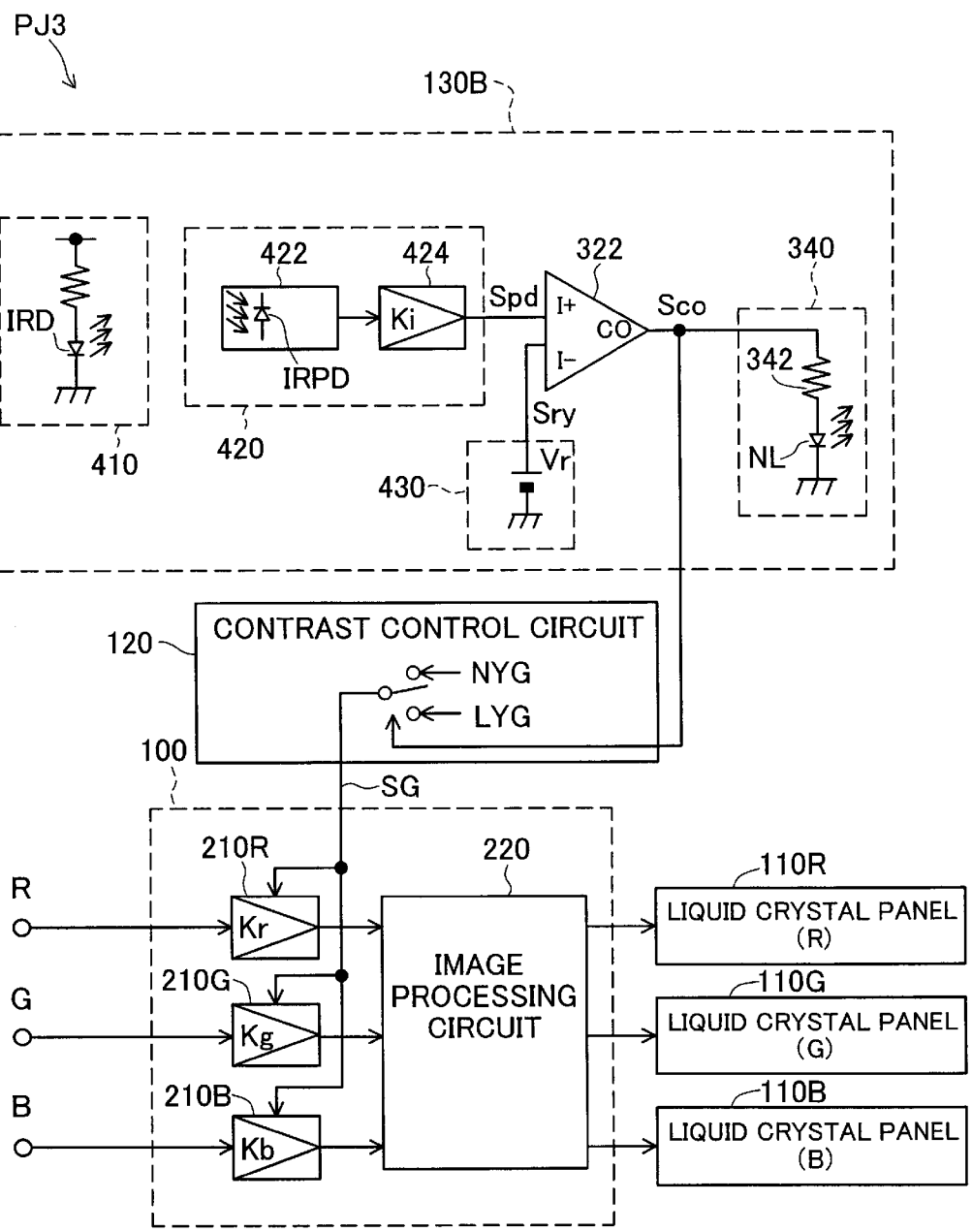
FIG. 7 schematically illustrates the structure of the projector PJ3.

FIG. 7 schematically illustrates the structure of the projector PJ3. The difference of this projector PJ3 from the projector PJ1 of the first embodiment is that the detector unit 130 is replaced by a detector unit 130B.

The detector unit 130B includes an infrared emission unit 410, an infrared detector 420, an infrared reference luminance level generator 430, the comparator 322, and the information unit 340.

The infrared emission unit 410 uses the infrared emitting diode IRD to emit infrared. The infrared detector 420 has an infrared receiving unit 422 that utilizes the infrared photodiode IRPD and an amplifier circuit 424 that amplifies signals output from the infrared receiving unit 422. The infrared detector 420 receives the infrared rays (reflected infrared rays) emitted from the infrared emission unit 410 and reflected by the screen SC (see FIG. 1) or by the human body in the path of the projection rays, and outputs the luminance of the received reflected infrared rays (infrared reflection luminance) as a reflection luminance signal Spd. The amplifier circuit 424 has the construction similar to that of the amplifier circuit 314 (FIG. 3).

The infrared reference luminance level generator 430 uses a voltage source to generate a reference level Vr, which is output as a reference luminance signal Sry.

The comparator 322 compares the infrared reflection luminance represented by the reflection luminance signal Spd with the infrared reference luminance represented by the reference luminance signal Sry and outputs the result of the comparison as a detection signal Sco.

Like the quantity of reflection of the projection rays detected by the luminance detector 310 (FIG. 3) of the first embodiment, the reflection of infrared rays emitted from the infrared emission unit 410, reflected by either of the reflecting surfaces, and received by the infrared receiving unit 422 depends upon the length of the path from the infrared emitting diode IRD to the infrared photodiode IRPD. The greater length of the path leads to the smaller reflection luminance. When a person approaches the path of the projection rays, part of the infrared is reflected by the human body. The length of the path of infrared rays reflected by the human body is less than the length of the path of infrared rays reflected by the screen SC. Approach of a person into the path of the projection rays thus heightens the signal level of the reflection luminance signal Spd representing the infrared reflection luminance detected by the infrared detector 420, compared with that under the non-approach condition. The approach of a person closer to the projector PJ3 leads to the greater reflection luminance.

The signal level Vr of the reference luminance signal Sry and an amplification factor Ki of the amplifier circuit 424 are adjusted in advance to make the signal level Vr of the reference luminance signal Sry higher than the level of the reflection luminance under the non-approach condition but lower than the level of the reflection luminance under the condition of approach of a person within a preset distance from the projection lens PL.

The following procedure may be applied to set the amplification factor Ki. The procedure locates a reflector having a reflection factor equivalent to the reflection factor of the human face in the vicinity of a certain position where approach of the person is detected (that is, a preset distance). The procedure then sets an adequate value to the reference level Vr and gradually increases the amplification factor Ki of the amplifier circuit 424 to find a specific value of the amplification factor Ki, at which the signal level of the detection signal Sco rises from the low level VL to the high level VH. This completes setting of the amplification factor Ki.

In the case where a person is within the preset distance, the signal level of the detection signal Sco output from the comparator 322 changes from the low level to the high level. While the person is within the preset distance in the path of the projection rays, the level of the reflection luminance signal Spd is higher than the level of the reference luminance signal Sry, and the signal level of the detection signal Sco is kept at the high level. This detects approach of a person. The contrast control circuit 120 adjusts the amplification factors Kr, Kg, and Kb of the amplifier circuits 210R, 210G, and 210B (FIG. 3) to regulate the quantities of the respective color rays output from the liquid crystal panels 110R, 110G, and 110B, thus controlling the output luminous flux of the projection rays.

As discussed above, when a person is within a preset distance from the projection lens PL in the path of the projection rays, the projector PJ3 of this embodiment controls the output luminous flux of the projection rays, thus effectively relieving the unpleasantness due to the direct incidence of the projection rays output from the projector into the field of vision of the person. Unlike the projectors PJ1 and PJ2 of the first and the second embodiments, the third embodiment does not use reflection of the projection rays but utilizes infrared radiation to detect approach of a person. Detection of approach of a person is thus not affected by the variation in output luminous flux of the projection rays. The projector PJ3 of this embodiment accordingly does not require the reset control circuit 350 shown in FIGS. 3 and 5.

As clearly understood from the above description, the infrared emission unit 410 and the infrared detector 420 correspond to the luminance detector of the present invention, and the comparator 322 corresponds to the luminance comparator. The detector unit 130B and the contrast control circuit 120 correspond to the luminous flux control device of the present invention.

D. Fourth Embodiment

Figure 8:
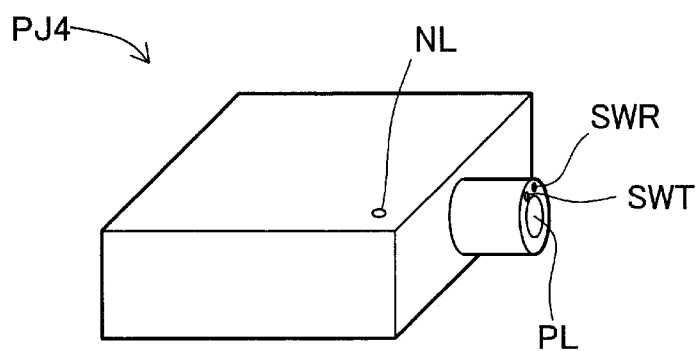
FIG. 8 is a perspective view schematically illustrating the appearance of a projector PJ4 in a fourth embodiment.

FIG. 8 is a perspective view schematically illustrating the appearance of a projector PJ4 in a fourth embodiment. An ultrasonic wave transmitter element SWT and an ultrasonic wave receiving element SWR are disposed in a neighborhood of a projection lens PL of this projector PJ4 toward the light outgoing face of the projection lens PL. A light emitting diode NL is mounted on the top face of the casing of the projector PJ4.

Figure 9:
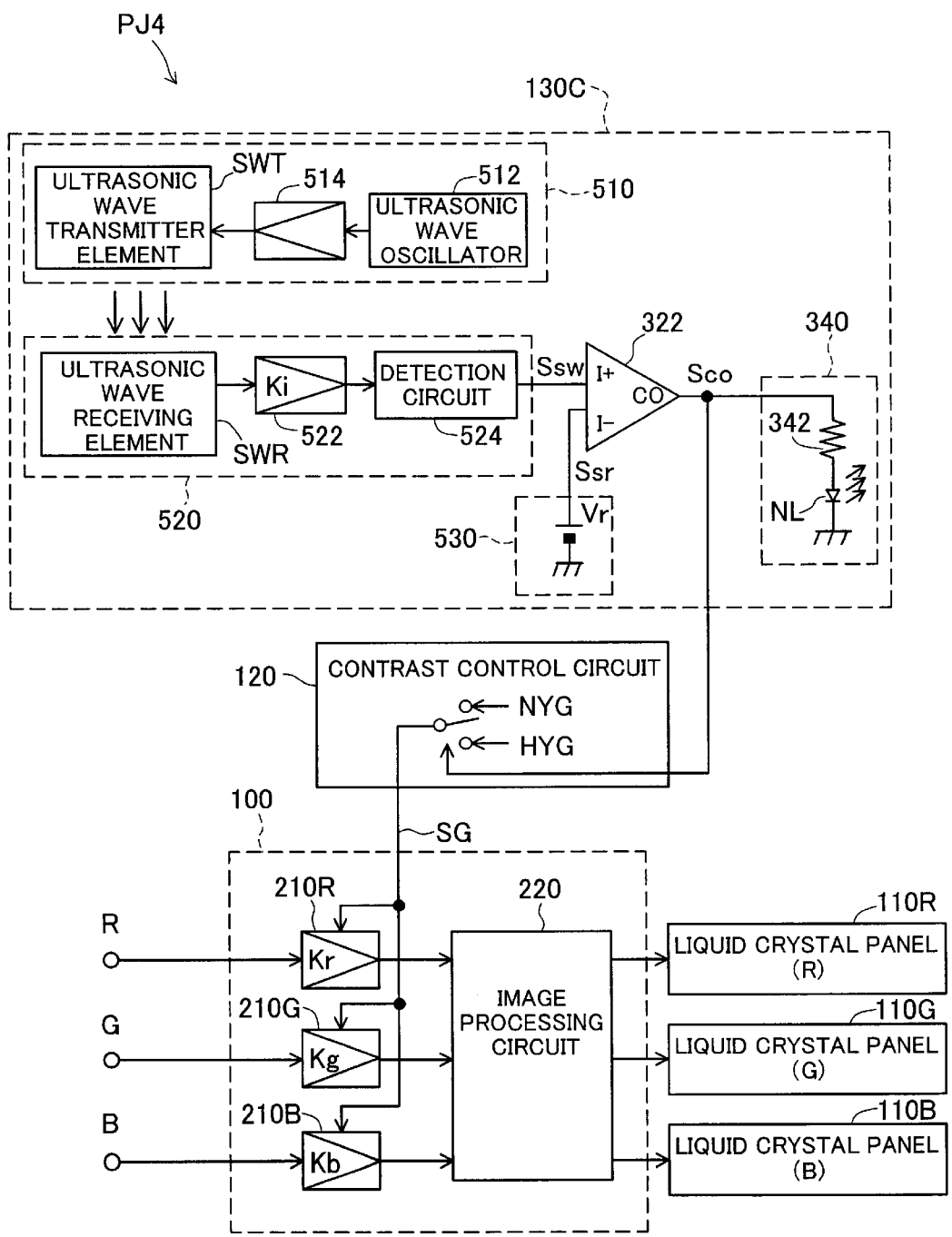
FIG. 9 schematically illustrates the structure of the projector PJ4.

FIG. 9 schematically illustrates the structure of the projector PJ4. The difference of the projector PJ4 from the projector PJ3 of the third embodiment is that the infrared emission unit 410 and the infrared detector 420 of the detector unit 130B are replaced by an ultrasonic wave transmitter 510 and an ultrasonic wave receiver 520.

In the ultrasonic wave transmitter 510 of a detector unit 130C, an ultrasonic wave signal generated by an ultrasonic wave oscillator 512 is amplified by an amplifier circuit 514 and is transmitted via the ultrasonic wave transmitter element SWT. The ultrasonic wave receiver 520 receives the ultrasonic wave (reflected ultrasonic wave) transmitted from the ultrasonic wave transmitter 510 and reflected by the screen SC or by the human body in the path of the projection rays, and outputs the strength of the received reflected ultrasonic wave (received ultrasonic wave strength) as a received ultrasonic wave signal Ssw.

The ultrasonic wave reference level generator 530 uses a voltage source to generate a reference level Vr (reference received ultrasonic wave strength), which is output as a reference received ultrasonic wave signal Ssr.

The comparator 322 compares the received ultrasonic wave strength represented by the received ultrasonic wave signal Ssw with the reference received ultrasonic wave strength represented by the reference received ultrasonic wave signal Ssr, and outputs the result of the comparison as a detection signal Sco.

The configuration of this embodiment replaces the infrared emission unit 410 and the infrared detector 420, which are used in the projector PJ3 of the third embodiment, with the ultrasonic wave transmitter 510 and the ultrasonic wave receiver 520, and utilizes not a variation in luminance of the reflected infrared rays but a variation in strength of the received ultrasonic wave to detect approach of a person in the path of the projection rays. When a person is within a preset distance from the projection lens PL in the path of the projection rays, the projector PJ4 of this embodiment controls the output luminous flux of the projection rays, thus effectively relieving the unpleasantness due to the direct incidence of the projection rays output from the projector into the field of vision of the person.

As clearly understood from the above description, the ultrasonic wave transmitter 510 and the ultrasonic wave receiver 520 correspond to the ultrasonic wave detector of the present invention. The comparator 322 corresponds to the ultrasonic wave comparator of the present invention. The detector unit 130C and the contrast control circuit 120 correspond to the luminous flux control device of the present invention.

E. Fifth Embodiment

Figure 10:
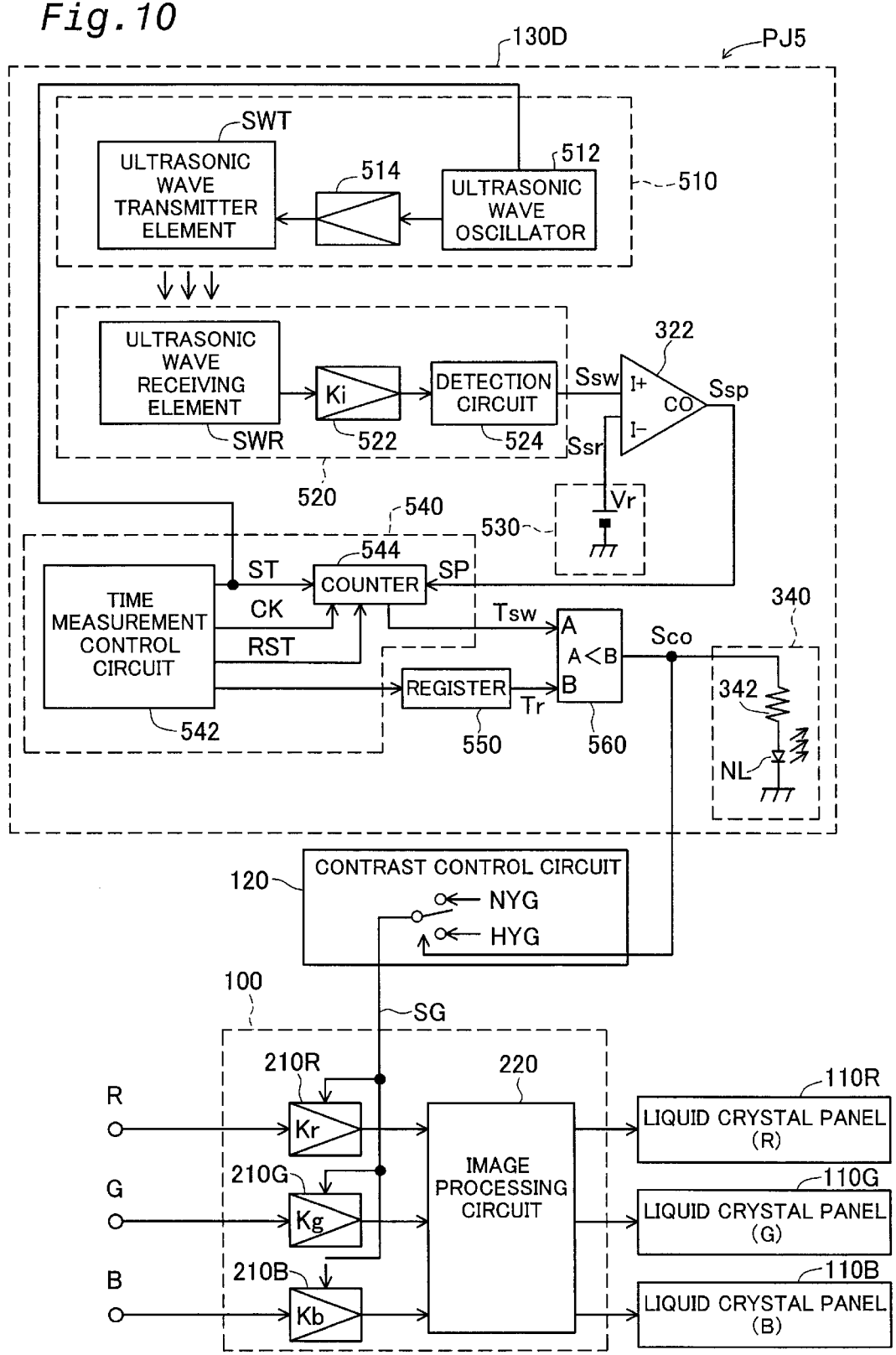
FIG. 10 schematically illustrates the structure of a projector PJ5 in a fifth embodiment.

FIG. 10 schematically illustrates the structure of a projector PJ5 in a fifth embodiment. This projector PJ5 has the similar appearance to that of the projector PJ4 of the fourth embodiment, and illustration of the appearance is thus omitted. The difference of the projector PJ5 from the projector PJ4 of the fourth embodiment is that the detector unit 130C is replaced by a detector unit 130D.

The detector unit 130D includes the ultrasonic wave transmitter 510, the ultrasonic wave receiver 520, the comparator 322, the ultrasonic wave reference level generator 530, a time measurement unit 540, a register 550, a digital comparator 560, and the information unit 340. In the ultrasonic wave transmitter 510, the ultrasonic wave oscillator 512 generates an ultrasonic wave signal synchronously with a start signal ST output from a time measurement control circuit 542 of the time measurement unit 540. The generated ultrasonic wave signal is amplified by the amplification circuit 514 and is transmitted via the ultrasonic wave transmitter element SWT. The ultrasonic wave receiver 520 receives the ultrasonic wave (reflected ultrasonic wave) transmitted from the ultrasonic wave transmitter 510 and reflected by the screen SC or by part of the human body in the path of the projection rays, and outputs the strength of the received reflected ultrasonic wave (received ultrasonic wave strength) as the received ultrasonic wave signal Ssw.

The ultrasonic wave reference level generator 530 uses a voltage source to generate a reference level Vr (reference received ultrasonic wave strength), which is output as a reference received ultrasonic wave signal Ssr.

The comparator 322 compares the received ultrasonic wave strength represented by the received ultrasonic wave signal Ssw with the reference received ultrasonic wave strength represented by the reference received ultrasonic wave signal Ssr, and outputs the result of the comparison as an ultrasonic wave detection signal SP (Ssp).

A counter 544 of the time measurement unit 540 continues counting the number of clocks included in the clock signal CK between an input of the start signal ST and an input of the ultrasonic wave detection signal SP. When the counter 544 reaches its full count prior to the input of the ultrasonic wave detection signal SP, the counter 544 stops counting and keeps the full count. When the ultrasonic wave detection signal SP is input or when the counter 544 reaches its full count, the current count is output by a non-illustrated register and is kept until being updated. The signal output from the counter 544 is input as a receive time signal Tsw into the digital comparator 560. A reference count set by the time measurement control circuit 542 is registered in advance in the register 550, and is input as a reference time signal Tr into the digital comparator 560. The digital comparator 560 compares the receive time signal Tsw with the reference time signal Tr and raises its output from the low level to the high level when the level of the receive time signal Tsw is lower than the level of the reference time signal Tr.

The time period between the transmission from the ultrasonic wave transmitter 510 and the receipt by the ultrasonic wave receiver 520 varies depending upon the length of the transfer path of the received ultrasonic wave signal. The longer transfer path results in the longer time period. The receive time of the ultrasonic wave reflected by the human body in the path of the projection rays is shorter than the receive time of the ultrasonic wave reflected by the screen SC. In one preferable application, a specific receive time, when the ultrasonic wave is reflected at a desired position of detection (that is, a position apart from the projection lens PL by a preset distance), is set in the register 550. In the case of a shorter receive time measured by the time measurement unit 540, the signal level of the detection signal Sco output from the digital comparator 560 rises from the low level to the high level. This proves that a person is within the preset distance from the projection lens PL in the path of the projection rays.

As described above, the configuration of this embodiment detects approach of a person in the path of the projection rays by utilizing the variation in time period between the transmission and the receipt of the ultrasonic wave (that is, the receive time). Like the other embodiments discussed previously, the projector of this embodiment controls the output luminous flux of the projection rays, when a person is within a preset distance from the projection lens PL in the path of the projection rays. This effectively relieves the unpleasantness due to the direct incidence of the projection rays output from the projector into the field of vision of the person.

The digital comparator 560 corresponds to the time comparator of the present invention. The detector unit 130D and the contrast control circuit 120 correspond to the luminous flux control device of the present invention.

The present invention is not restricted to the above embodiments or their modifications, but there may be many other modifications, changes, and alterations without departing from the scope or spirit of the main characteristics of the present invention.

INDUSTRIAL APPLICABILITY

As discussed above, the projector of the present invention is suitable for application to presentation systems, TV meeting systems, and home theater systems.

What is claimed is:

1. A projector comprising: an electro-optic device that outputs rays modulated according to a given image signal; an image processing unit that transmits the image signal to said electro-optic device; and a luminous flux control device that controls an output luminous flux of projection rays, which are output from said electro-optic device and projected, said luminous flux control device including:
a detector unit that detects a person who enters a path of the projection rays, and
a controller unit that controls the output luminous flux of the projection rays when said detector detects the entering of the person,
said detector unit including:
a luminance detector having a light receiving unit that is disposed in a neighborhood of a projection lens, from which the projection rays are output, and receives reflected rays obtained by reflection of the projection rays, said luminance detector outputting a reflection luminance of the reflected rays received by said light receiving unit as a reflection luminance signal,
a reference luminance level generator that specifies a reference luminance based on a luminance signal level of an image signal corresponding to the projection rays, and outputs the specified reference luminance as a reference luminance signal, and
a luminance comparator that compares the reflection luminance signal with the reference luminance signal, and
said controller unit controlling the output luminous flux of the projection rays according to an output of said luminance comparator.

2. A projector comprising: an electro-optic device that outputs rays modulated according to a given image signal; an image processing unit that transmits the image signal to said electro-optic device; and a luminous flux control device that controls an output luminous flux of projection rays, which are output from said electro-optic device and projected, said luminous flux control device including:
a detector unit that detects a person who enters a path of the projection rays, and
a controller unit that controls the output luminous flux of the projection rays when said detector detects the entering of the person,
said image processing unit including:
a reference image signal generator that generates a reference image signal, which is used to output the projection rays corresponding to a preset luminance signal level, and transmits the reference image signal to said electro-optic device,
said detector unit including: a luminance detector having a light receiving unit that is disposed in a neighborhood of a projection lens, from which the projection rays are output, and receives reflected rays obtained by reflection of the projection rays, said luminance detector outputting a reflection luminance of the reflected rays received by said light receiving unit as a reflection luminance signal,
a reference luminance level generator that registers, as a reference luminance signal, a reflection luminance output from said luminance detector when the projection rays corresponding to the preset luminance signal level are output in response to the reference image signal, and
a luminance comparator that compares the reflection luminance signal with the reference luminance signal,
said controller unit controlling the output luminous flux of the projection rays according to an output of said luminance comparator.

3. A projector comprising: an electro-optic device that outputs rays modulated according to a given image signal; an image processing unit that transmits the image signal to said electro-optic device; and a luminous flux control device that controls an output luminous flux of projection rays, which are output from said electro-optic device and projected, said luminous flux control device including:
 a detector unit that detects a person who enters a path of the projection rays, and
 a controller unit that controls the output luminous flux of the projection rays when said detector detects the entering of the person,
said detector unit including:
 a luminance detector having an infrared emission unit and an infrared receiving unit that are disposed in a neighborhood of a projection lens, from which the projection rays are output, said infrared receiving unit of said luminance detector receiving reflected rays of infrared radiation emitted from said infrared emission unit, said luminance detector outputting a reflection luminance of the received reflected infrared rays as a reflection luminance signal, and
 a luminance comparator that compares the reflection luminance signal with a preset reference luminance signal,
said controller unit controlling the output luminous flux of the projection rays according to an output of said luminance comparator.

4. A projector comprising: an electro-optic device that outputs rays modulated according to a given image signal; an image processing unit that transmits the image signal to said electro-optic device; and a luminous flux control device that controls an output luminous flux of projection rays, which are output from said electro-optic device and projected,
 said luminous flux control device including:
  a detector unit that detects a person who enters a path of the projection rays, and
  a controller unit that controls the output luminous flux of the projection rays when said detector detects the entering of the person,
 said detector unit including:
  an ultrasonic wave detector having an ultrasonic wave transmitter unit and an ultrasonic wave receiver unit that are disposed in a neighborhood of a projection lens, from which the projection rays are output, said ultrasonic wave receiver unit of said ultrasonic wave detector receiving a reflected wave of an ultrasonic wave transmitted from said ultrasonic wave transmitter unit, said ultrasonic wave detector measuring a strength of the received ultrasonic wave, and
  an ultrasonic wave comparator that compares the measurement of the received ultrasonic wave strength with a preset reference received ultrasonic wave strength, said controller unit controlling the output luminous flux of the projection rays according to an output of said ultrasonic wave comparator.

5. A projector comprising: an electro-optic device that outputs rays modulated according to a given image signal; an image processing unit that transmits the image signal to said electro-optic device; and a luminous flux control device that controls an output luminous flux of projection rays, which are output from said electro-optic device and projected,
 said luminous flux control device including:
  a detector unit that detects a person who enters a path of the projection rays, and
  a controller unit that controls the output luminous flux of the projection rays when said detector detects the entering of the person,
 said detector including:
  an ultrasonic wave transmitter unit that is disposed in a neighborhood of a projection lens, from which the projection rays are output;
  an ultrasonic wave receiver unit that is disposed in the neighborhood of the projection lens and receives a reflected wave of an ultrasonic wave transmitted from said ultrasonic wave transmitter unit,
  a time measurement unit that continues measuring time between transmission of the ultrasonic wave from said ultrasonic wave transmitter unit and receipt of the ultrasonic wave by said ultrasonic wave receiver unit, and
  a time comparator that compares the observed time by said time measurement unit with a preset reference time,
 said controller unit controlling the output luminous flux of the projection rays according to an output of said time comparator.

6. A projector comprising: an electro-optic device that outputs rays modulated according to a given image signal; an image processing unit that transmits the image signal to said electro-optic device; and a luminous flux control device that controls an output luminous flux of projection rays, which are output from said electro optic device and projected,
 said luminous flux control device including:
  a detector unit that detects a person who enters a path of the projection rays, and
  a controller unit that controls the output luminous flux of the projection rays when said detector detects the entering of the person,
 said luminous flux control device further including: an information unit that, when said controller unit controls the output luminous flux of the projection rays, informs the person of the controlled output luminous flux of the projection rays with at least one of a voice and a picture.

7. A projector in accordance with claim 1, wherein said luminous flux control device further including an information unit that, when said controller unit controls the output luminous flux of the projection rays, informs the person of the controlled output luminous flux of the projection rays with at least one of a light, a voice and a picture.

8. A projector in accordance with claim 2, wherein said luminous flux control device further including an information unit that, when said controller unit controls the output luminous flux of the projection rays, informs the person of the controlled output luminous flux of the projection rays with at least one of a light, a voice and a picture.

9. A projector in accordance with claim 3, wherein said luminous flux control device further including an information unit that, when said controller unit controls the output luminous flux of the projection rays, informs the person of the controlled output luminous flux of the projection rays with at least one of a light, a voice and a picture.

10. A projector in accordance with claim 4, wherein said luminous flux control device further including an information unit that, when said controller unit controls the output luminous flux of the projection rays, informs the person of the controlled output luminous flux of the projection rays with at least one of a light, a voice and a picture.

11. A projector in accordance with claim 5, wherein said luminous flux control device further including an information unit that, when said controller unit controls the output luminous flux of the projection rays, informs the person of the controlled output luminous flux of the projection rays with at least one of a light, a voice and a picture.

* * * * *